United States Patent
Riolfatti et al.

(10) Patent No.: US 11,224,945 B2
(45) Date of Patent: Jan. 18, 2022

(54) SUPPORT DEVICE FOR SUPPORTING A TUBE ON A TUBE WORKING MACHINE AND TUBE WORKING MACHINE COMPRISING SUCH A SUPPORT DEVICE

(71) Applicant: ADIGE S.p.A., Levico Terme (IT)

(72) Inventors: Riccardo Riolfatti, Besenello (IT); Carlo Niato, Caldonazzo (IT)

(73) Assignee: ADIGE S.p.A, Levico Terme (IT)

( * ) Notice: Subject to any disclaimer, the term of this patent is extended or adjusted under 35 U.S.C. 154(b) by 1000 days.

(21) Appl. No.: 15/700,590

(22) Filed: Sep. 11, 2017

(65) Prior Publication Data
US 2018/0071870 A1    Mar. 15, 2018

(51) Int. Cl.
| | |
|---|---|
| *B23K 26/38* | (2014.01) |
| *B23K 37/053* | (2006.01) |
| *B23K 37/02* | (2006.01) |
| *B23K 37/04* | (2006.01) |
| *B23K 101/06* | (2006.01) |

(52) U.S. Cl.
CPC .......... *B23K 26/38* (2013.01); *B23K 37/0288* (2013.01); *B23K 37/04* (2013.01); *B23K 37/0533* (2013.01); *B23K 37/0535* (2013.01); *B23K 37/0538* (2013.01); *B23K 2101/06* (2018.08)

(58) Field of Classification Search
CPC ................ B23K 2101/06; B23K 26/38; B23K 37/0288; B23K 37/04; B23K 37/0533; B23K 37/0535; B23K 37/0538; B23K 37/053; B23K 210/06; B23Q 3/064

USPC .......... 254/134.3 R; 30/90.1, 90.2; 409/219, 409/224
See application file for complete search history.

(56) References Cited

U.S. PATENT DOCUMENTS

| | | | |
|---|---|---|---|
| 6,772,493 B2* | 8/2004 | Yamanashi .............. | B23Q 1/66 269/309 |
| 9,533,355 B2* | 1/2017 | Esser ..................... | B23Q 3/183 |
| 2015/0174661 A1* | 6/2015 | Brandstrom ....... | B23K 37/0288 228/9 |
| 2016/0059363 A1* | 3/2016 | Ardisson ............ | B23K 26/0096 219/121.39 |

FOREIGN PATENT DOCUMENTS

| | | |
|---|---|---|
| DE | 10249106 A1 | 4/2004 |
| EP | 2017023 A1 | 1/2009 |

(Continued)

*Primary Examiner* — Dana Ross
*Assistant Examiner* — James F Sims, III
(74) *Attorney, Agent, or Firm* — Arent Fox LLP; Michael Fainberg (57) ABSTRACT

The support device comprises: a pivoting arm arranged to be rotatably supported at a first end thereof by a base of the machine for rotation about a first axis of rotation oriented transversely to a longitudinal axis of the tube; a cylindrical roller mounted at a second end of the pivoting arm opposite to the first end with its axis oriented parallel to the first axis of rotation; a variable-profile support member rotatably mounted at the second end of the pivoting arm for rotation about a second axis of rotation parallel to the first axis of rotation; a first driving system arranged to control the angular position of the pivoting arm about the first axis of rotation; and a second driving system arranged to control the angular position of the support member about the second axis of rotation.

10 Claims, 13 Drawing Sheets

(56) References Cited

FOREIGN PATENT DOCUMENTS

EP          2508298 A1    10/2012
WO      2008132767 A1    11/2008

* cited by examiner

SUPPORT DEVICE FOR SUPPORTING A TUBE ON A TUBE WORKING MACHINE AND TUBE WORKING MACHINE COMPRISING SUCH A SUPPORT DEVICE

CROSS-REFERENCE TO RELATED APPLICATIONS

This application claims priority to Italian Patent Application No. 102016000092105 filed on Sep. 13, 2016, the entire contents of which is hereby incorporated in its entirety by reference.

BACKGROUND OF THE INVENTION

The present invention relates to a support device intended to be used for supporting a tube on a tube working machine, particularly a laser tube cutting machine.

More specifically, the present invention relates to a support device intended to be used on a laser tube cutting machine wherein the tube to be worked is gripped at its rear end (tail end) by a tube-carrying carriage and is supported and guided in the vicinity of the working area, where a working head performs the envisaged working operations on the tube by means of a focused laser beam, by a so-called steady rest, wherein the tube-carrying carriage is movable in the direction of the longitudinal axis of the tube to control the feed movement of the tube and is also arranged to control the rotational movement of the tube about its longitudinal axis, whereas the steady rest is typically mounted in a fixed position on the base of the machine.

In machines of this type, in particular small to medium-sized machines, a proper support of the tube to be worked (which is typically 6 to 8 meters long) is required over the entire length of the tube, especially when the tube is particularly flexible (e.g. a small diameter tube). To this end, the machine is provided with support devices arranged between the tube-carrying carriage and the steady rest to support the tube to be worked by keeping it in axis, i.e. keeping the longitudinal axis of the tube aligned with the axis defined by the tube-carrying carriage and the steady rest. Such support devices must be able to be lowered one after the other as the tube is fed in order to avoid interference with the tube-carrying carriage moving toward the steady rest.

Various support devices are known for supporting a tube on a tube working machine, in particular a laser tube cutting machine.

According to a first known solution, the support device comprises a cylindrical roller supported at the end of a pivoting arm. In this case, rotation of the pivoting arm is numerically controlled to position the roller at the desired height. Such a support device is particularly suitable for tubes with a non-circular cross section, since it allows the tube to be kept in axis even when it is rotated by the tube-carrying carriage. However, such a support device is not able to retain the tube to be worked laterally.

According to a further known solution, the support device comprises a support member that is supported rotatably about a horizontal axis of rotation extending transversely to the tube to be worked, that is, lying in a plane perpendicular to the longitudinal axis of the tube. The support member has a cavity for housing the tube, said cavity having a cross-sectional profile that is shaped as an arc of circumference whose diameter varies depending on the angular position of the support member about said axis of rotation. More specifically, the cavity is shaped in such a way that the diameter of the arc-of-circumference profile increases continuously with the rotation of the support member in a given direction. By controlling the angular position of the support member about its axis of rotation, it is thus possible to set the profile of the cavity suitable for supporting the tube to be worked. Such a support member is not only able to adapt to the size of the tube to be worked, but is also able to retain the tube laterally. On the other hand, such a support member is particularly expensive as it requires special machining and is also subject to wear at its cavity due to friction caused by the tube sliding on the surface of the cavity. This further known solution of support device is therefore suitable for use with light and flexible tubes, rather than for use with tubes that are heavy and large and/or have a very rough surface.

SUMMARY OF THE INVENTION

It is an object of the present invention to provide a support device for supporting a tube on a tube working machine, particularly a laser tube cutting machine, which is able to operate with various types of tubes without being affected by the drawbacks of the prior art discussed above.

This and other objects are fully achieved by means of a support device comprising
 a pivoting arm supported rotatably about a first axis of rotation that is oriented transversely to the tube to be worked,
 a cylindrical roller mounted at the free end of the pivoting arm with its axis oriented parallel to the first axis of rotation,
 a variable-profile support member also mounted at the free end of the pivoting arm for rotation about a second axis of rotation parallel to the first axis of rotation, the support member being movable by rotation about the second axis of rotation between a working position, in which it supports the tube to be worked with a given profile selectable by rotation of the support member about said second axis of rotation, and a non-working position, in which the support member is placed underneath the cylindrical roller and thus allows the tube to be worked to be supported by the cylindrical roller,
 a first driving system for controlling the angular position of the pivoting arm about the first axis of rotation, and
 a second driving system for controlling the angular position of the support member about the second axis of rotation.

By virtue of such a configuration, the support device according to the invention allows to use alternatively the variable-profile support member or the cylindrical roller depending on the tube to be worked, using for example the variable-profile support member to support flexible and/or smaller tubes and the cylindrical roller to support rigid and/or larger tubes.

In a machine equipped with several support devices according to the present invention, it is possible for example to use, at the same time, the variable-profile support member for some support devices and the cylindrical roller for the remaining support devices, depending on the characteristics of the tube to be worked. For some types of tubes, for example, it may be desirable to use the variable-profile support member only for one or more support devices in the vicinity of the steady rest and instead use the cylindrical roller for the remaining support devices, thereby retaining the tube laterally by means of the variable-profile support member only at a portion of the tube immediately preceding the steady rest.

BRIEF DESCRIPTION OF THE DRAWINGS

Further features and advantages of the present invention will become more apparent from the following detailed description, given purely by way of non-limiting example with reference to the accompanying drawings, wherein.

DETAILED DESCRIPTION OF PREFERRED EMBODIMENTS

In the description and the claims that follow, the term "longitudinal" is used to identify a direction coinciding with, or parallel to, the longitudinal axis of the tube to be worked, while the term "transverse" is used to identify a direction lying on a plane perpendicular to the longitudinal axis of the tube to be worked. Furthermore, terms such as "upper" and "lower", or "horizontal" and "vertical", etc., when used in connection with the support device, are intended to refer to the mounted condition of the support device on the machine.

Figure 1A:
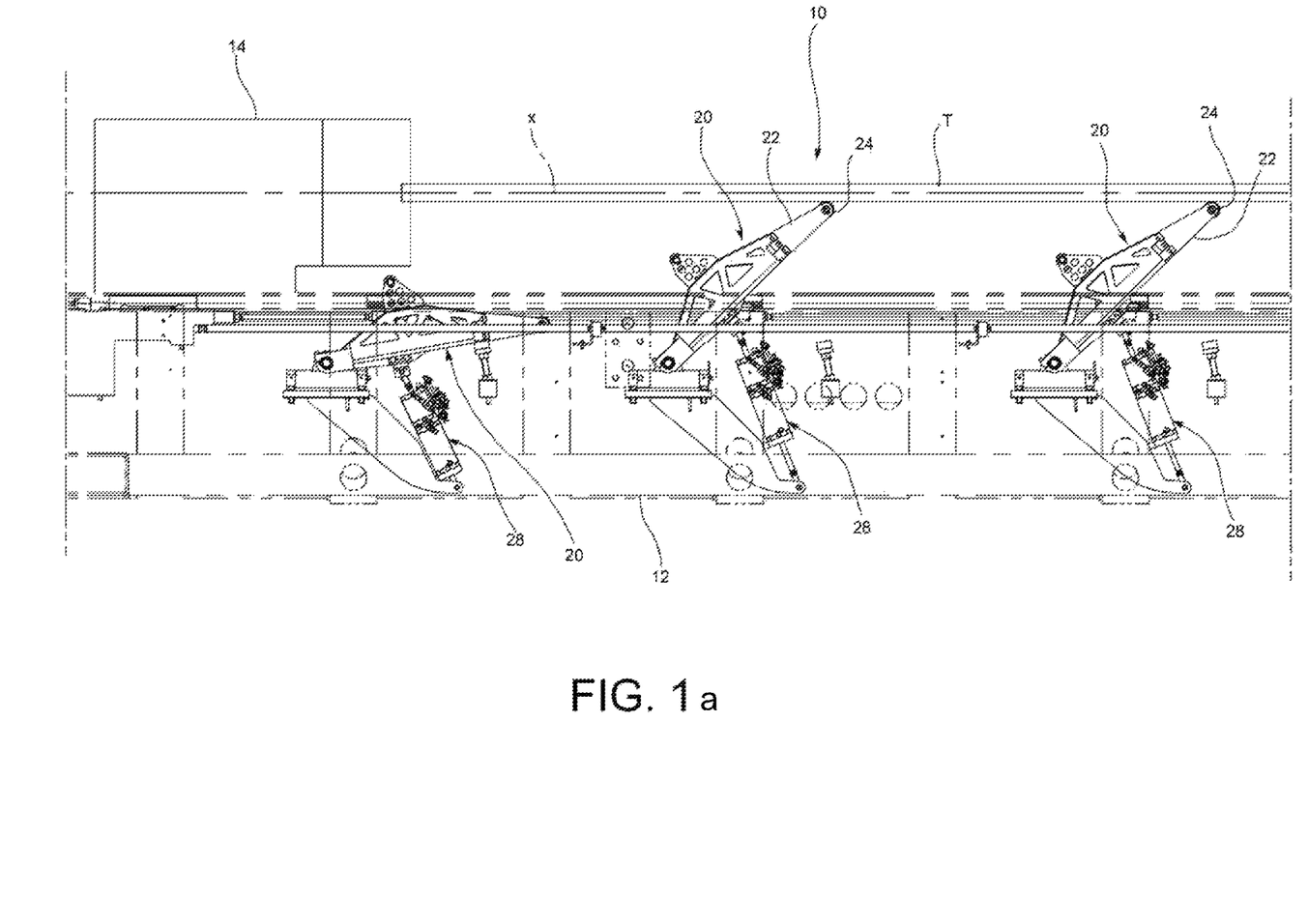
FIGS. 1a and 1b are side elevation views which show a rear portion (on the side of the tube-carrying carriage) and a front portion (on the side of the working head), respectively, of a laser tube cutting machine provided with supporting devices for supporting a tube to be worked according to an embodiment of the present invention.
Figure 1B:
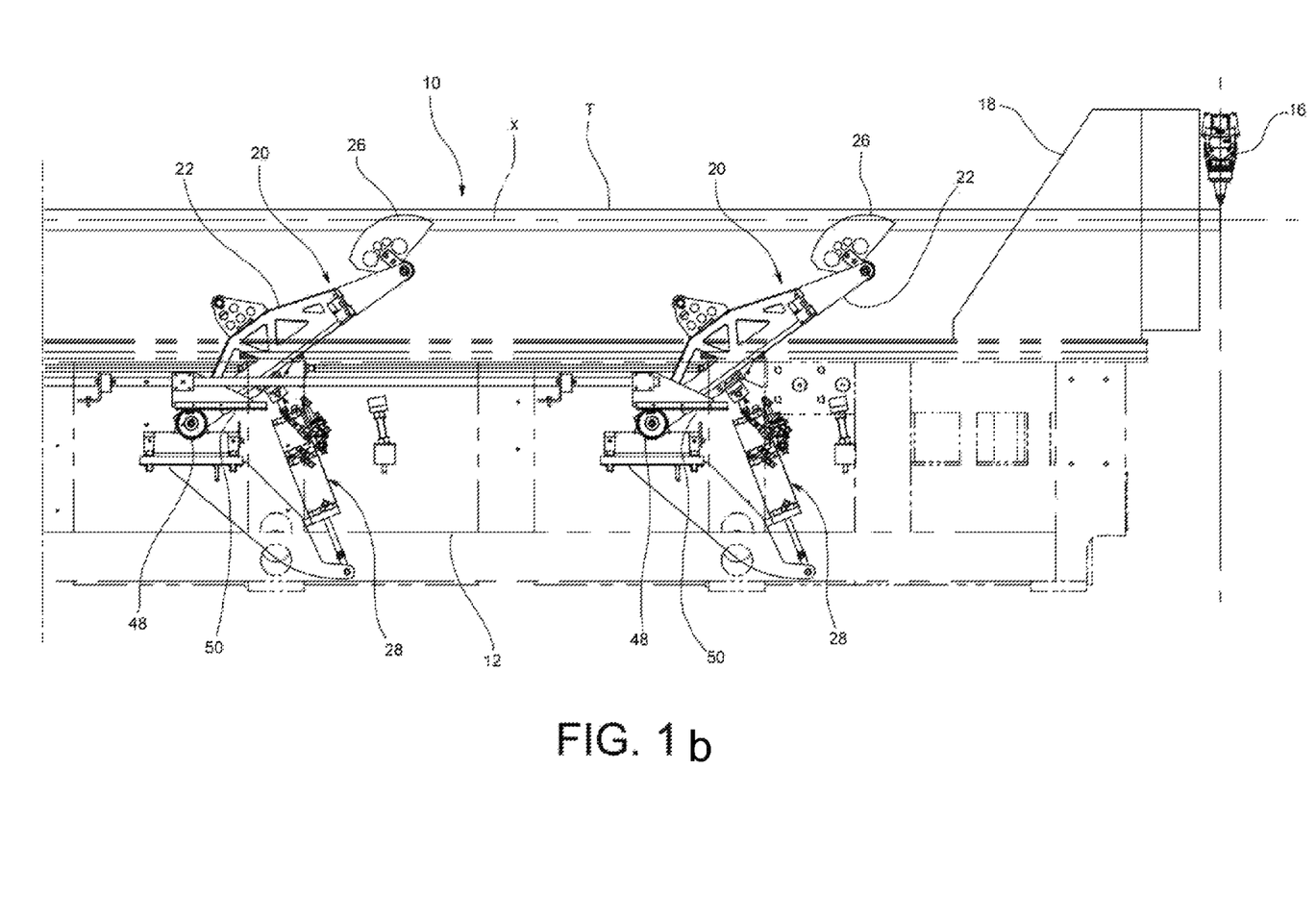

Referring first to FIGS. 1a and 1b, a tube working machine to which a support device according to the invention is applicable is generally indicated 10. In the embodiment proposed herein, the machine is a laser tube cutting machine, but the invention is also applicable to other types of tube working machines where there is a need to support the tube to be worked over its entire length or part of its length. The machine 10 comprises, in a per-se-known manner, a base 12, a tube-carrying carriage 14, a working head 16 and a steady rest 18. The tube to be worked on the machine 10 is indicated T and may have a cross section of any shape, for example of circular or square shape. The longitudinal axis of the tube T is indicated x.

The tube-carrying carriage 14 is mounted on the base 12 so as to be movable in the direction of the longitudinal axis x of the tube T to control the feed movement of the tube and is also arranged to control the rotational movement of the tube T about the longitudinal axis x. The tube-carrying carriage 14 grips the tube T to be worked at its rear end, i.e. at its opposite end with respect to the working area, by means of suitable clamping means (not shown, but of a per-se-known type). The working head 16 is, in the embodiment illustrated herein, arranged to emit a focused laser beam to carry out working operations, in particular cutting operations, on the tube T. The steady rest 18 is mounted on the base 12 next to the working head 16, in a fixed position or with a certain possibility of movement along the direction of the longitudinal axis x, so as to support and guide the tube T in the vicinity of the working area.

The machine 10 further comprises a plurality of support devices 20 (in the illustrated example five support devices) for supporting the tube T between the tube-carrying carriage 14 and the steady rest 18 so as to keep the longitudinal axis x of the tube aligned with the axis defined by the clamping means of the tube-carrying carriage 14 and the guide means of the steady rest 18.

Figure 2:
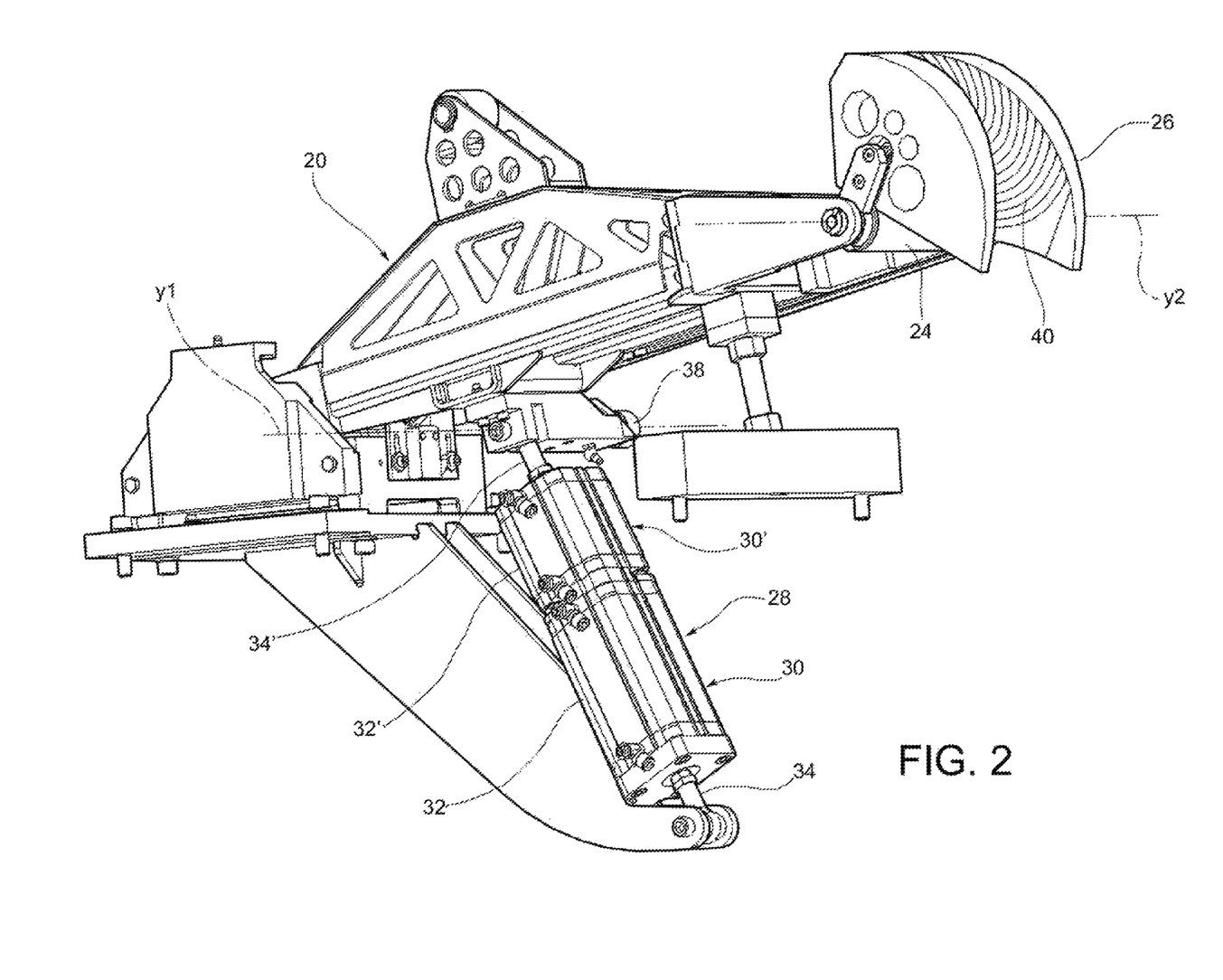
FIG. 2 is an isometric view of a support device according to an embodiment of the present invention.

Referring now in particular to FIG. 2, each support device 20 basically comprises a pivoting arm 22, a cylindrical roller 24 and a support member 26.

The pivoting arm 22 is rotatably supported at a first end thereof by the base 12 for rotation about a first axis of rotation y1 oriented horizontally and transversely (i.e. perpendicular to the longitudinal axis x). The pivoting arm 22 is thus movable, by rotation about the first axis of rotation y1, between a fully lowered position (in which position, with reference to FIG. 1a, the first support device 20, in the order from the tube-carrying carriage 14 to the steady rest 18, is arranged) and a maximum raised position (in which position the second and third supporting devices 20, in the order from the tube-carrying carriage 14 to the steady rest 18 with reference to FIG. 1a, are arranged).

Figure 8:
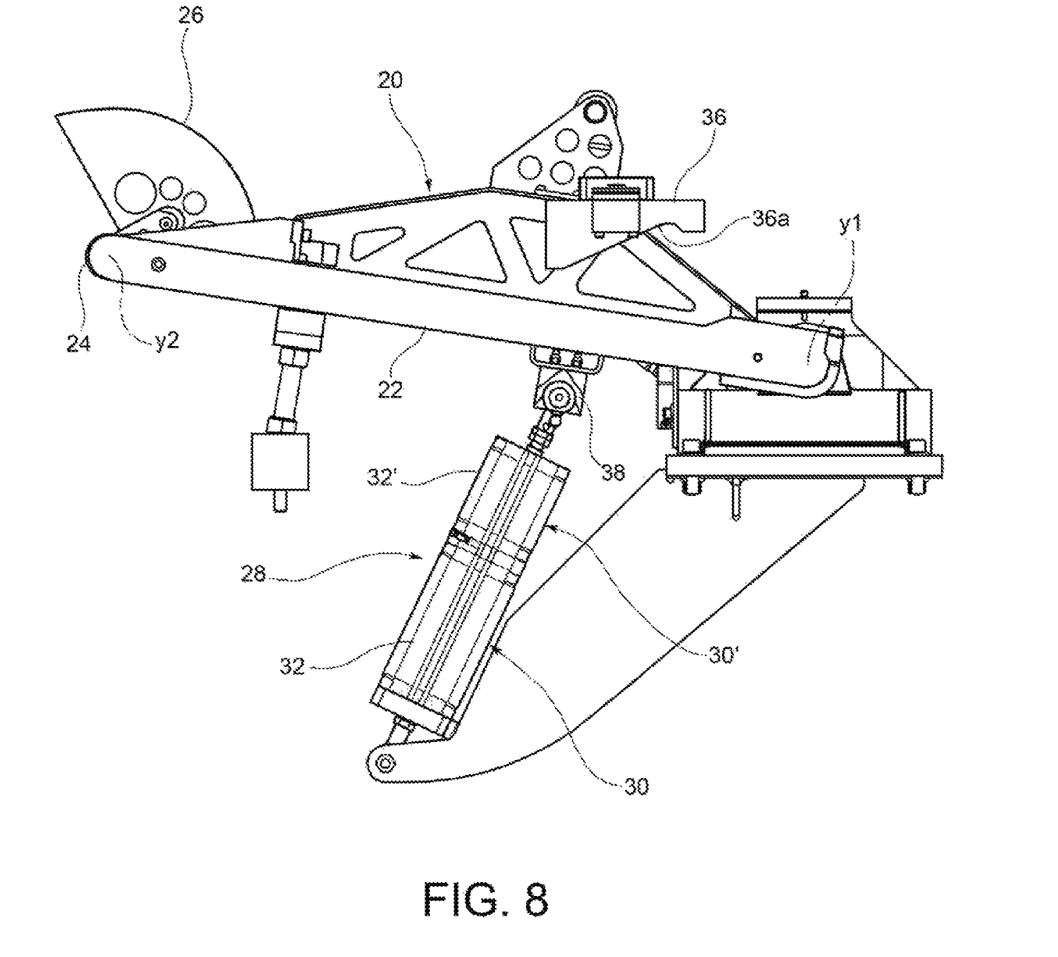
FIGS. 8 to 12 are side views showing the support device of FIG. 2 in different operating conditions.

In order to control the rotation of the pivoting arm 22 about the first axis of rotation y1, the support device 20 is provided with a first driving system comprising an actuator 28, that is made, for example, as a linear actuator hinged at one end thereof to a stationary part of the machine, i.e. a part integral with the base 12, and at its opposite end to the pivoting arm 22, so that the extension of the linear actuator causes the rotation of the pivoting arm 22 to the maximum raised position, while the retraction of the linear actuator causes the rotation of the pivoting arm 22 to the fully lowered position. According to the embodiment illustrated herein, the linear actuator 28 comprises a first pneumatic cylinder 30 having a body 32 and a rod 34, and a second pneumatic cylinder 30' having a body 32' and a rod 34'. The two pneumatic cylinders 30 and 30' are arranged with the respective bodies 32 and 32' secured to each other and with the respective rods 34 and 34' facing opposite sides. The rod 34 of the first pneumatic cylinder 30 is hinged to the base 12, whereas the rod 34' of the second pneumatic cylinder 30' is hinged to the pivoting arm 22. When the rods 34 and 34' of the two pneumatic cylinders 30 and 30' are both retracted (i.e. both cylinders 30 and 30' are not supplied with air under pressure), as shown for example in FIG. 8, the pivoting arm 22 is in the fully lowered position. On the other hand, when the rods 34 and 34' of the two pneumatic cylinders 30 and 30' are both extended (i.e. both cylinders 30 and 30' are supplied with air under pressure), as shown for example in FIG. 10, the pivoting arm 22 is in the maximum raised position.

The first driving system further comprises a cam mechanism for adjusting the angular position of the pivoting arm 22, for example to adapt to the size of the tube T to be worked, when the linear actuator 28 is extended, i.e. when the pneumatic cylinders 30 and 30' are both supplied with air under pressure. As shown for example in FIGS. 9 and 10, the cam mechanism comprises a cam-shaped control member 36 and a rotating wheel 38. The cam-shaped control member 36 is movable (as described in detail below) in the longitudinal direction and has a control surface 36a inclined to the longitudinal direction. The rotating wheel 38 is supported by the pivoting arm 22 so as to be freely rotatable, in particular with its axis of rotation coinciding with the hinge axis about which the rod 34' of the second pneumatic cylinder 30' is hinged to the pivoting arm 22. When the two pneumatic cylinders 30 and 30' are supplied with air under pressure, the rotating wheel 38 is in contact with the control surface 36a of the cam-shaped control member 36. The longitudinal movement of the cam-shaped control member 36 in either direction causes the vertical movement of the rotating wheel 38 in either direction, and therefore the rotation of the pivoting arm 22 about the first axis of rotation Y1 in either direction. In particular, as shown in FIGS. 9 and 10 and with reference to the point of view of a person looking at these figures, a movement of the cam-shaped control member 36 to the right produces a downward movement of the rotating wheel 38, and thus a downward (counterclockwise) rotation of the pivoting arm 22 about the first axis of rotation y1, whereas a movement of the cam-shaped control member 36 to the left produces an upward movement of the rotating wheel 38 and thus an upward (clockwise) rotation of the pivoting arm 22 about the first axis of rotation y1.

Figure 3A:
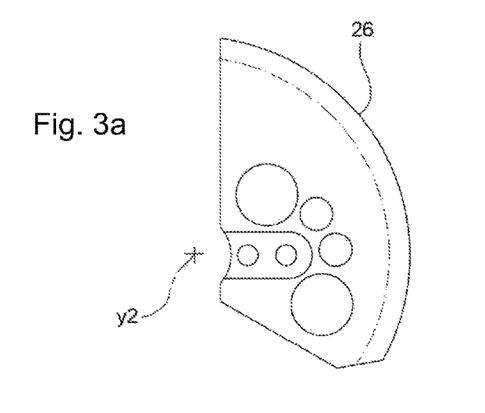
FIGS. 3a and 3b are a side view and a front view, respectively, of the variable-profile support member of the support device of FIG. 2, in a first angular position of the support member.
Figure 3B:
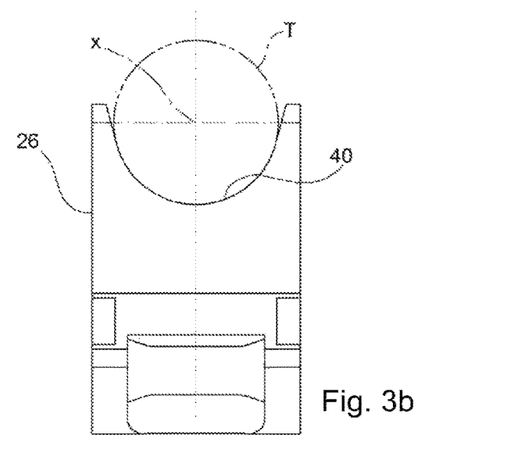
Figure 4A:
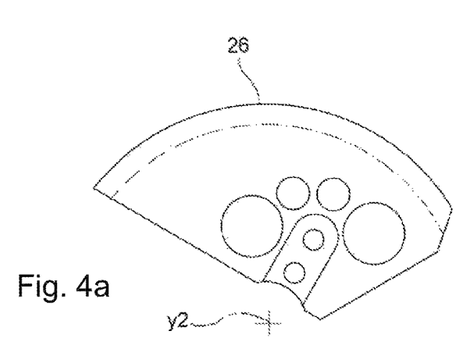
FIGS. 4a and 4b are a side view and a front view, respectively, of the variable-profile support member of the support device of FIG. 2, in a second angular position of the support member.
Figure 4B:
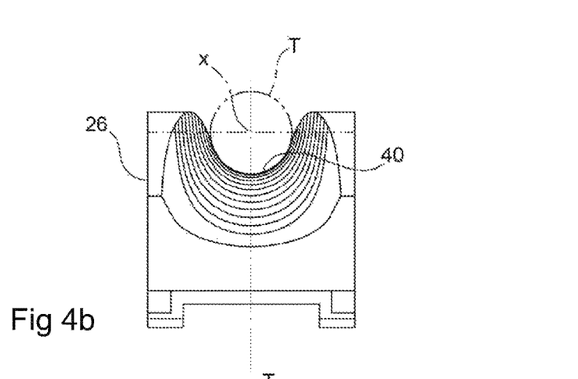
Figure 5A:
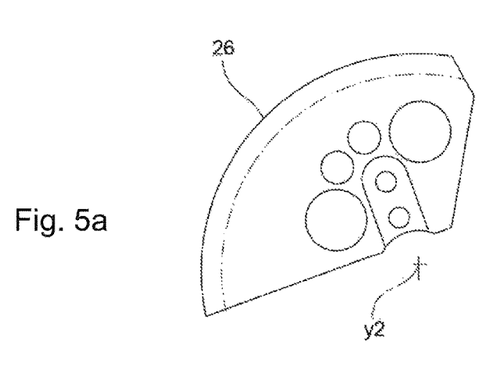
FIGS. 5a and 5b are a side view and a front view, respectively, of the variable-profile support member of the support device of FIG. 2, in a third angular position of the support member.
Figure 5B:
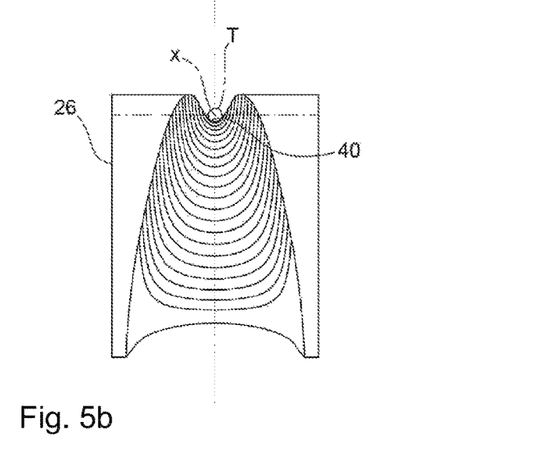

Still with reference in particular to FIG. 2, the cylindrical roller 24 is mounted at the free end of the pivoting arm 22 with its axis oriented parallel to the first axis of rotation y1. The support member 26 is also mounted at the free end of the pivoting arm 22 so as to be rotatable about a second axis of rotation y2 parallel to the first axis of rotation y1, for example coinciding with the axis of the cylindrical roller 24. In a per-se-known manner, the support member 26 has a cavity 40 for housing the tube T, which cavity has a cross-sectional profile shaped as an arc of circumference whose diameter varies depending on the angular position of the support member about the second axis of rotation y2. More specifically, the cavity 40 is shaped in such a way that the diameter of the arc-of-circumference profile increases continuously with the rotation of the support member 26 in a given direction (counterclockwise direction, with respect to the point of view of the observer of FIG. 2). By controlling the angular position of the support member 26 about the second axis of rotation y2, it is thus possible to set the profile of the cavity 40 suitable to support the tube T to be worked so as to maintain its longitudinal axis x aligned with the axis defined by the tube-carrying carriage 14 and the steady rest 18. In this respect, FIGS. 3, 4 and 5 show the support member 26 in three different angular positions, namely, a first angular position (FIGS. 3a and 3b) wherein the cross-sectional profile of the cavity 40 has a maximum diameter value, a second angular position (FIGS. 4a and 4b) wherein the cross-sectional profile of the cavity 40 has an intermediate diameter value, and a third angular position (FIGS. 5a and 5b) wherein the cross-sectional profile of the cavity 40 has a minimum diameter value. As can be seen from FIGS. 3, 4 and 5, by suitably adjusting the angular position of the support member 26 about the second axis of rotation y2, tubes T of different diameters may be supported by the support member 26 with their longitudinal axis x at the same distance from the second axis of rotation y2 and therefore, if the pivoting arm 22 is held in a fixed position, in the same vertical position with respect to the base 12 (therefore also with respect to the tube-carrying carriage 14 and to the steady rest 18).

Figure 6:
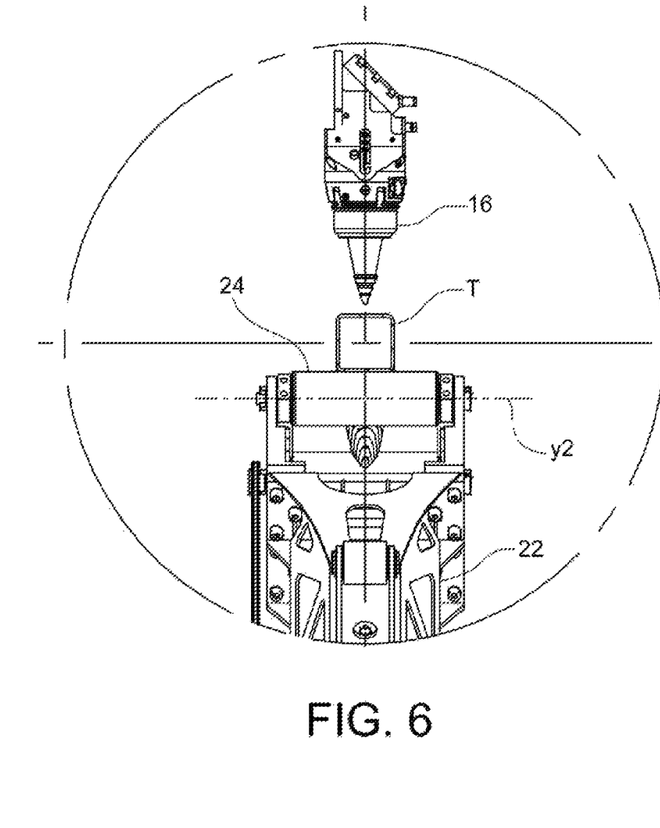
FIGS. 6 and 7 are front views showing the upper portion of two different support devices of the machine of FIGS. 1a and 1b, the first of which is in the operating condition wherein the tube to be worked is resting on the cylindrical roller of the device, while the second one is in the operating condition wherein the tube to be worked is resting on the variable-profile support member of the device.
Figure 7:
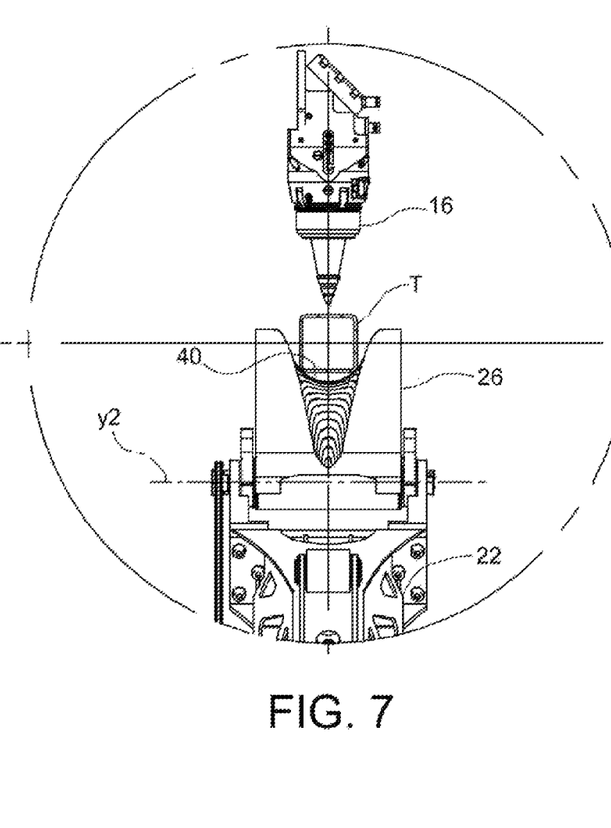
Figure 9:
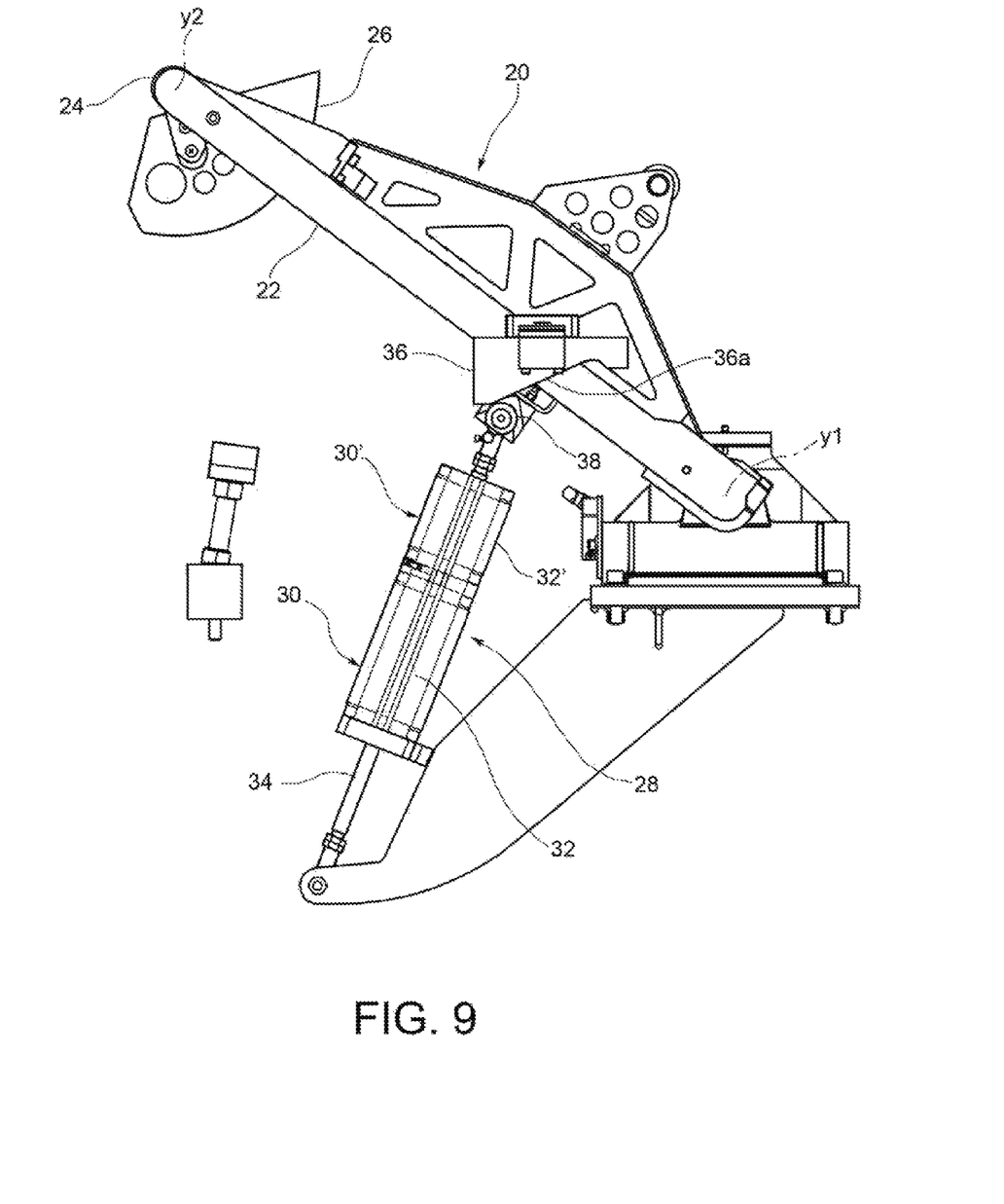
Figure 10:
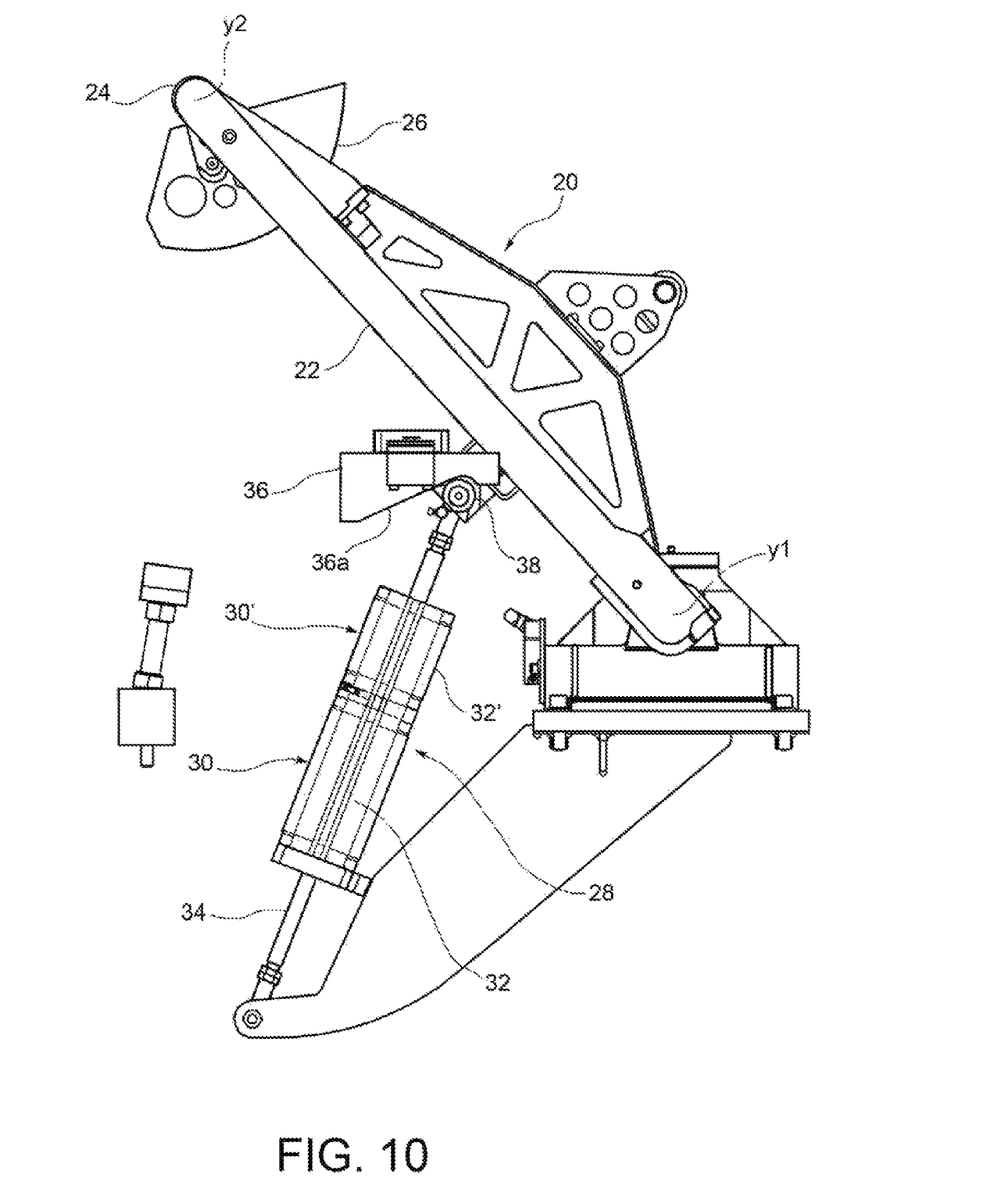
Figure 11:
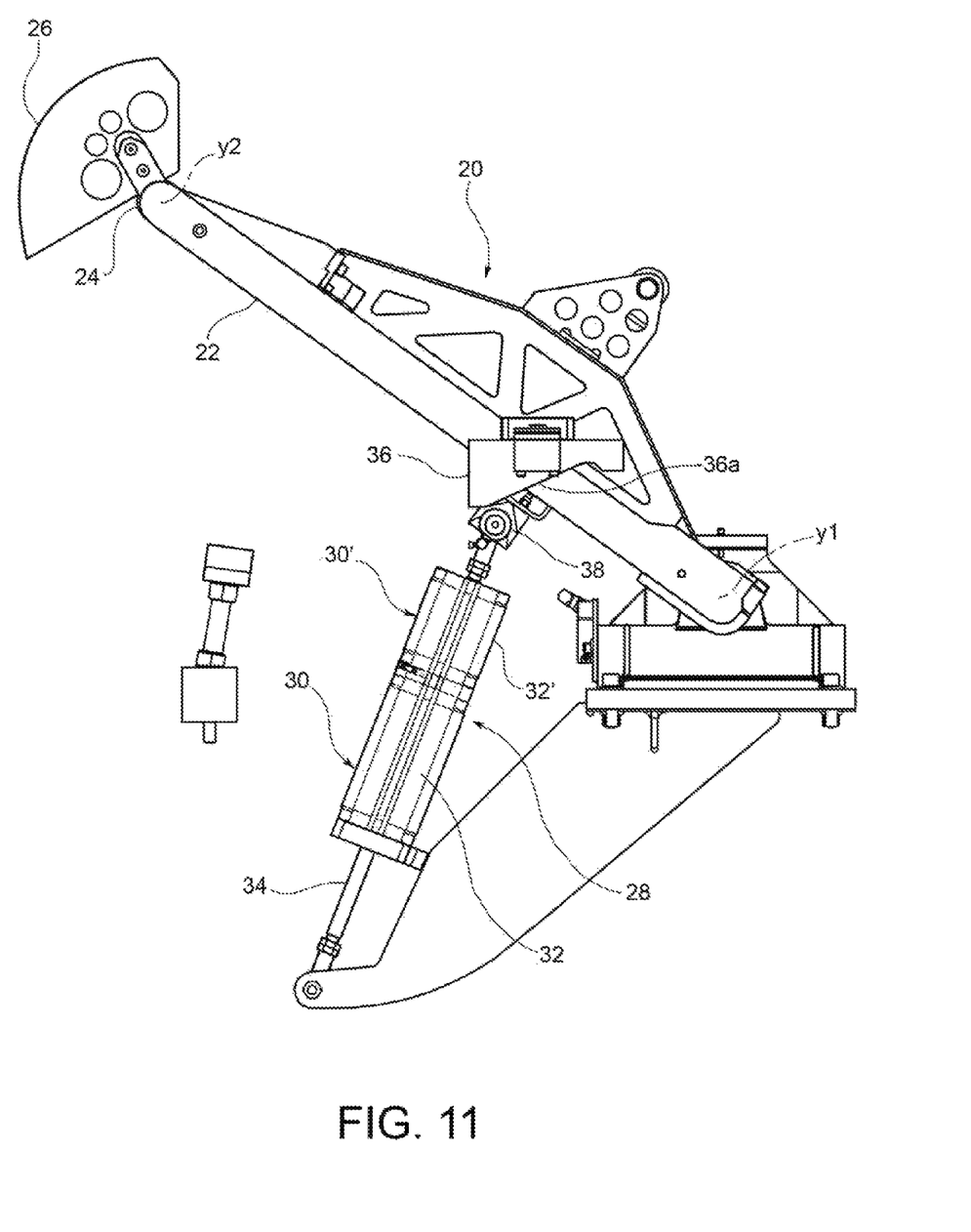
Figure 12:
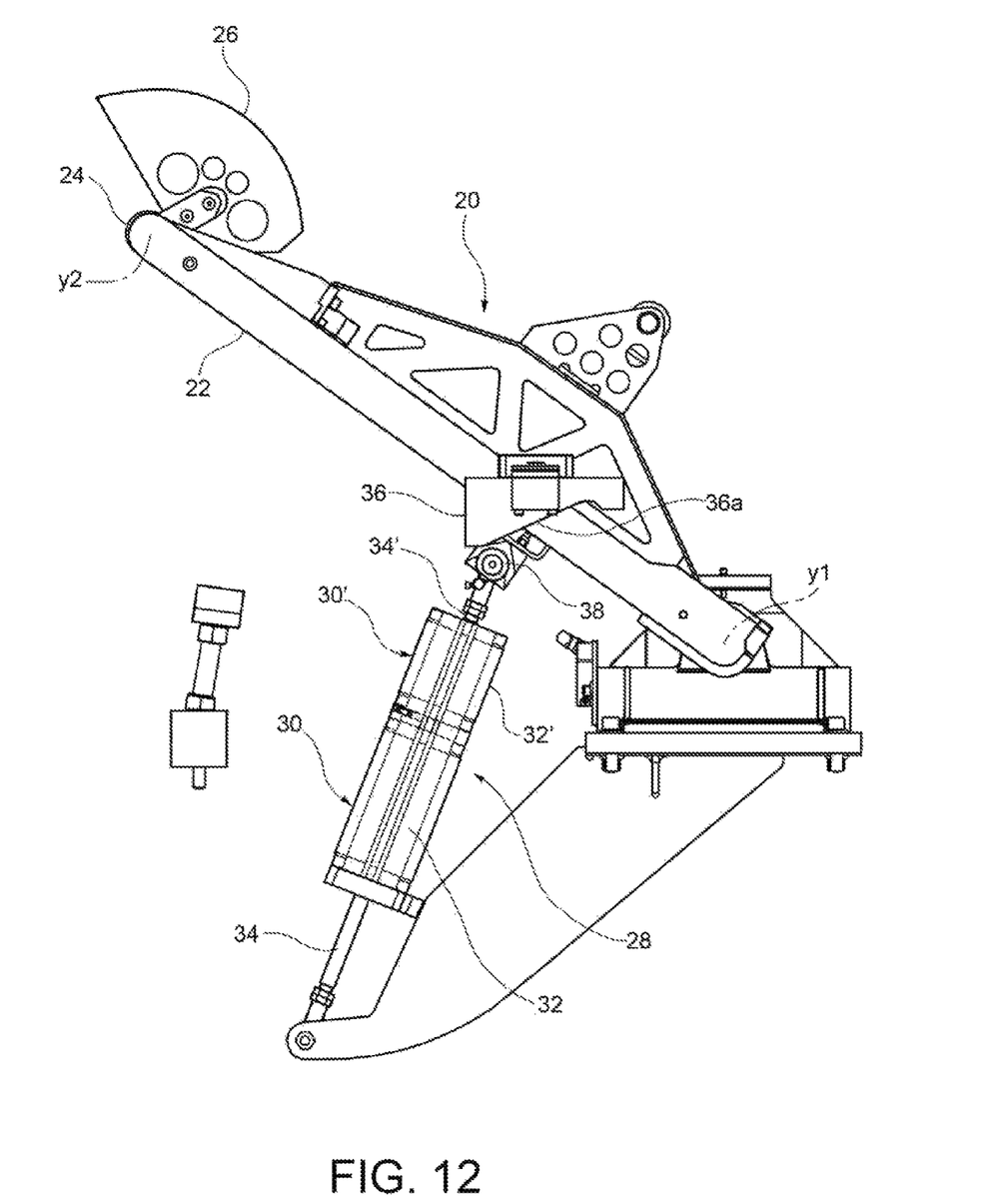

With reference to FIGS. 6 to 13, the support member 26 is movable between a working position, in which it supports the tube T to be worked (in particular, as explained above, with the possibility of selecting—by rotation of the support member 26 about the second axis of rotation y2—a given diameter of the cross-sectional profile of the cavity 40 as a function of the shape and/or sizes of the cross-section of the tube T), and a non-working position, in which the support member 26 is placed underneath the cylindrical roller 24 and thus allows to use the cylindrical roller 24 as a support for the tube T to be worked in place of the support member 26. FIGS. 6, 9 and 10 show the support device 20 with the support member 26 in the aforementioned non-working position, while FIGS. 7, 11, 12 and 13 show the support device 20 with the support member 26 in the aforementioned working position. In particular, FIGS. 6 and 7 show the support device 20 operating with a tube T having a square cross-section, both in the condition wherein the support member 26 is in the aforementioned non-working position, and thus the tube is supported by the cylindrical roller 24 (FIG. 6), and in the condition wherein the support member 26 is in the aforementioned working position, and thus the tube is supported by the support member 26 (FIG. 7).

Figure 13:
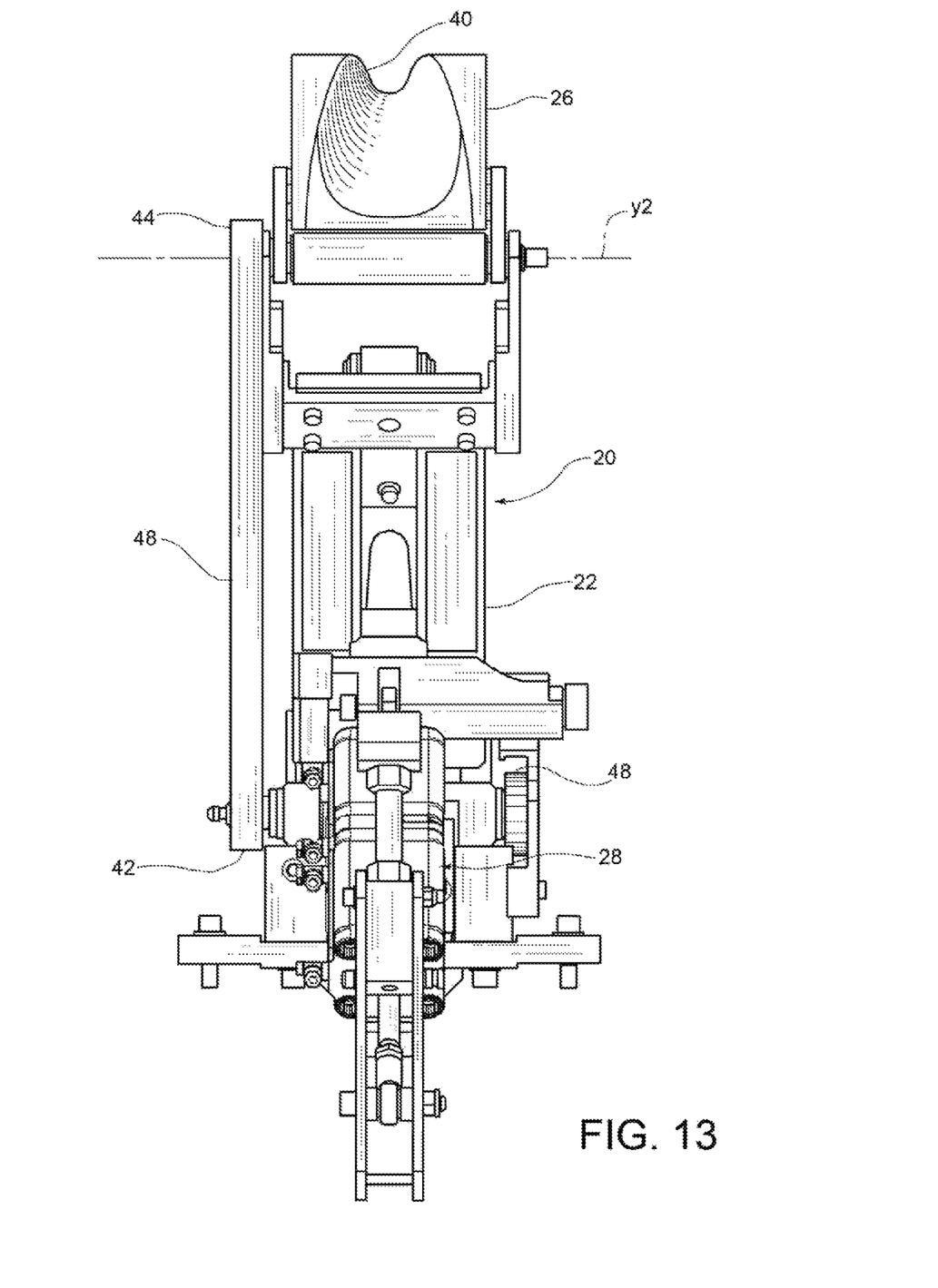
FIG. 13 is a front view of the support device of FIG. 2.

In order to be able to control the rotation of the support member 26 about the second axis of rotation y2, the support device 20 is provided with a second driving system, which according to one embodiment comprises a belt transmission mechanism. With reference in particular to FIG. 13, such transmission mechanism comprises a driving pulley 42, a driven pulley 44 drivingly connected for rotation with the support member 26 about the second axis of rotation y2, and a belt 46 wound about the driving pulley 42 and driven pulley 44. The driving pulley 42 is driven in rotation by means of, for example, a pinion 48, which is in turn driven in rotation by means of, for example, a rack 50 (FIG. 15), as explained in detail below. As a transmission means, a chain may be used instead of a belt, so the driving pulley and the driven pulley may be replaced with gear wheels. Naturally, the invention is not limited to the transmission mechanism described and illustrated herein, but rather the second driving system may include any other type of transmission mechanism suitable for controlling the rotational movement of the support member 26 about the second axis of rotation y2.

Figure 14:
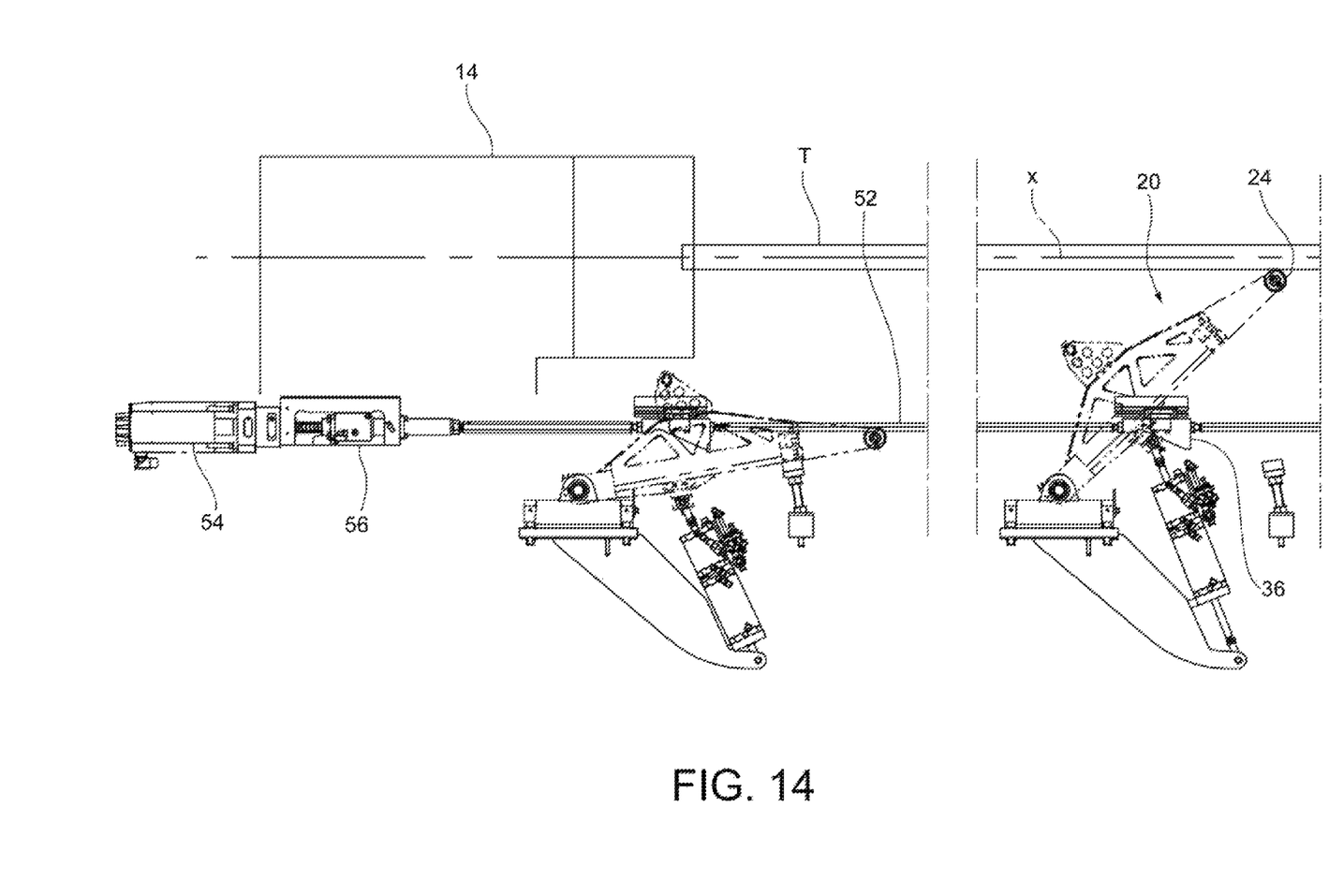
FIG. 14 is a side view of the machine of FIGS. 1a and 1b showing schematically a second driving system for controlling the movement of the pivoting arms of the support devices of the machine.
Figure 15:
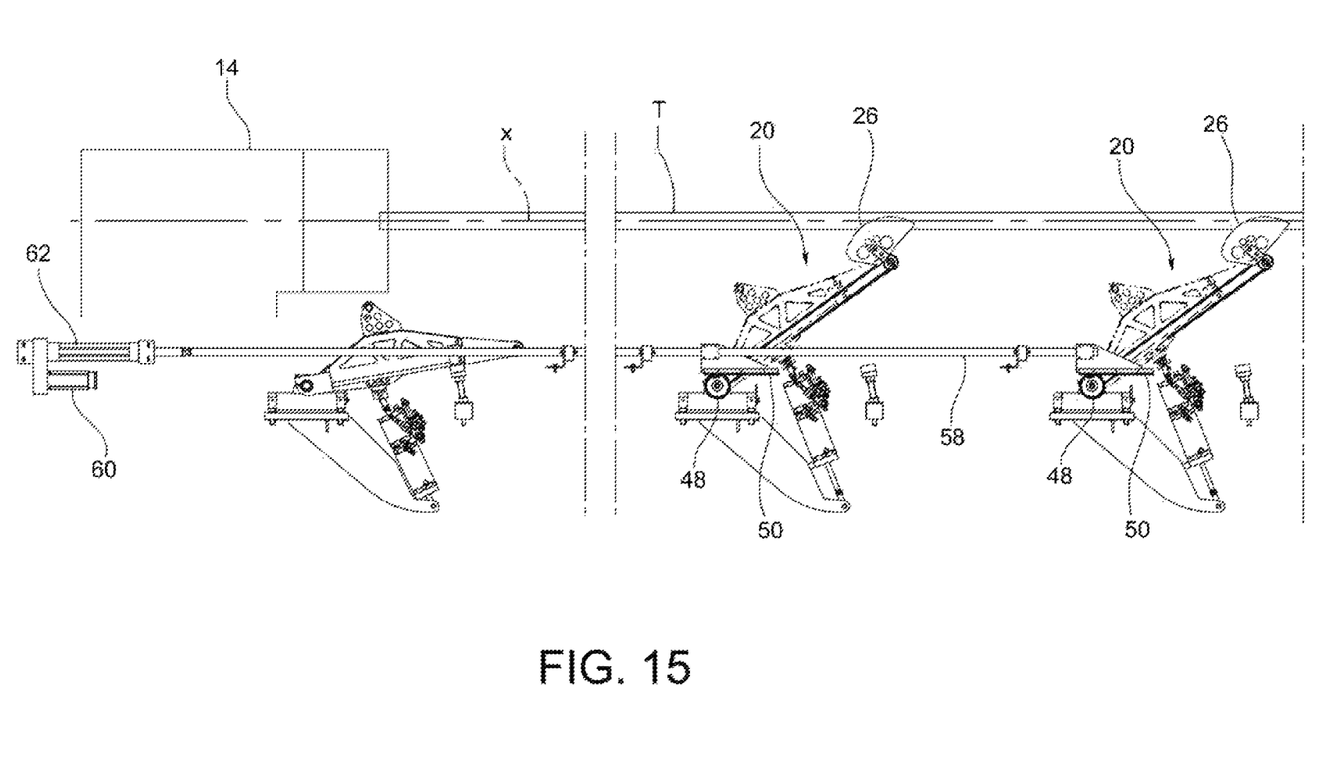
FIG. 15 is a side view of the machine of FIGS. 1a and 1b showing schematically a first driving system for controlling the movement of the support members of the support devices of the machine.

With reference now to FIG. 14, in the case wherein the machine is provided with a plurality of support devices 20, the cam-shaped control members 36 of the support devices 20 are preferably connected to each other, for example by means of a first rod 52, so that they may be simultaneously moved in the longitudinal direction and then simultaneously control the rotational movement of the pivoting arms 22 about the respective axes of rotation y1. The longitudinal translational movement of the rod 52 is controlled by a single actuation unit, preferably an electromechanical actuation unit, comprising for example an electric motor 54 coupled to a motion conversion mechanism 56 (for example, a screw and nut mechanism) arranged to convert the rotary motion generated by the electric motor 54 into translational motion of the rod 52, and hence of the cam-shaped control members 36 connected thereto. Likewise, as shown in FIG. 15, the racks 50 of the support devices 20 are also preferably connected to each other, for example by means of a second rod 58, so that they may be simultaneously moved in the longitudinal direction and thus simultaneously control the rotational movement of the support members 26 about the respective axes of rotation y2. The longitudinal translational movement of the rod 58 is controlled by a single actuation unit, preferably an electromechanical actuation unit, comprising for example an electric motor 60 coupled to a motion conversion mechanism 62 (for example, a screw and nut mechanism) arranged to convert the rotary motion generated by the electric motor 60 into translational motion of the rod 58, and thus of the racks 50 connected thereto.

The operation of the support device 20 described above will now be explained, with particular reference to the case of a machine 10 comprising a plurality of support devices 20.

The support device 20 may take a first operating condition wherein the pivoting arm 22 is fully lowered. This operating condition (which may be seen both in FIG. 8 and in FIG. 1a, as far as the first support device 20 is concerned) is obtained by discharging both the pneumatic cylinders 30 and 30' of the linear actuator 28. With the support device 20 in this condition, the tube-carrying carriage 14 may pass over the support device 20 in its feed movement towards the steady rest 18, without the risk of interference with the support device.

The support device 20 may also take a second operating condition wherein it is able to support the tube T to be worked by means of the cylindrical roller 24. This operating condition (which may be seen in FIGS. 9 and 10, as well as in FIG. 1a, as far as the second and third support devices 20, in the order from the tube-carrying carriage 14 to the steady rest 18, are concerned) is obtained by supplying air under pressure to both the pneumatic cylinders 30 and 30' of the linear actuator 28. The resulting extension of the pneumatic cylinders 30 and 30' produces a rotation of the pivoting arm 22 about the first axis of rotation y1 until the rotating wheel 38 (which, as already said, is supported by the pivoting arm 22) abuts against the control surface 36a of the cam-shaped control member 36. At this point, by virtue of the cooperation between the cam-shaped control member 36 and the rotating wheel 38 the angular position of the pivoting arm 22 about the first axis of rotation y1, and hence the vertical position of the cylindrical roller 24, may be adjusted so as to constantly ensure that the cylindrical roller 24 is in contact with the tube T to be worked, even in the case of a tube having a non-circular cross-section that is rotated by the tube-carrying carriage 14 about its axis during machining. As explained above, this adjustment operation is carried out by suitably controlling, by means of the actuation unit comprising the electric motor 54 and the motion conversion mechanism 56, the translational movement of the first rod 52 to which the cam-shaped control members 36 of the various support devices 20 are connected.

The support device 20 may finally take a third operating condition, wherein it is able to support the tube T to be worked by means of the support member 26. This operating condition (which may be seen in FIGS. 11 to 13, in addition to FIG. 1b) is obtained by discharging one of the two pneumatic cylinders 30 and 30' (in particular the pneumatic cylinder 30') of the linear actuator 28, so as to lower the pivoting arm 22 until the rotating wheel 38 disengages from the control surface 36a of the cam-shaped control member 36. With the pivoting arm 22 held in the angular position thus reached, the support member 26 is brought to the working position in which it is in contact with the tube T to be worked. By suitably adjusting the angular position of the support member 26 about the second axis of rotation y2 in the manner previously described, the contact between the support member 26 and the tube T is ensured at a given diameter of the arc-of-circumference profile of the cavity 40 of the support member 26. Due to the fact that, in this operating condition, the rotating wheel 38 no longer engages the cam-shaped control member 36, the latter may continue to move longitudinally without causing rotation of the pivoting arm 22. This allows to have at the same time some support devices 20 with the support member 26 in the working position and other support devices 20 with the cylindrical roller 24 in the working position, without the driving systems of the support members 26 and of the cylindrical rollers 24 affecting each other.

As is apparent from the foregoing description, a support device according to the present invention may be used to overcome the drawbacks of the prior art mentioned above, owing to the fact that a cylindrical roller or a variable-profile support member may be alternatively used to support the tube to be worked. Moreover, both when the cylindrical roller is used and when the support member is used to support the tube to be worked, the support device is able to continuously adjust the position of the cylindrical roller or of the support member in order on the one hand to ensure continuous contact with the tube and on the other to keep the longitudinal axis of the tube aligned with the axis defined by the tube-carrying carriage and the steady rest.

Naturally, the principle of the invention remaining unchanged, the embodiments and manufacturing details may widely vary compared to those described and illustrated purely by way of a non-limiting example, without thereby departing from the scope of the invention as defined in the accompanying claims.

What is claimed is:

1. A support device for supporting a tube on a tube working machine, the support device comprising
a pivoting arm arranged to be rotatably supported at a first end thereof by a base of the machine for rotation about a first axis of rotation oriented transversely to a longitudinal axis of the tube as the tube is being fed by a tube-carrying carriage of the machine to a working head of the machine,
a cylindrical roller mounted at a second end of the pivoting arm opposite to said first end with an axis of the cylindrical roller oriented parallel to the first axis of rotation,
a variable-profile support member which is rotatably mounted at the second end of the pivoting arm for rotation about a second axis of rotation parallel to the first axis of rotation and has a saddle-shaped cavity for receiving the tube, wherein the cavity has a cross-sectional profile which varies along a cavity length, and wherein the cross-sectional profile of the cavity which is presented to the tube has a variable size depending on the angular position of the support member about the second axis of rotation, wherein the cavity has a variable shaped contact surface for contacting the tube, wherein the variable shaped contact surface has a shape which varies along the cavity length, and wherein the support member is movable, by rotation about the second axis of rotation, between a working position, in which the support member receives the tube in the cavity, and a non-working position, in which the support member is placed underneath the cylindrical roller, thereby allowing the tube to be supported on the cylindrical roller, a first driving system for controlling the angular position of the pivoting arm about the first axis of rotation, and a second driving system for controlling the angular position of the support member about the second axis of rotation.

2. The support device of claim 1, wherein the cavity of the support member has a cross-sectional profile whose size progressively increases in a given direction of rotation of the support member about the second axis of rotation.

3. The support device of claim 1, wherein the cavity of the support member has a cross-sectional profile shaped as an arc of circumference.

4. The support device of claim 1, wherein the axis of the cylindrical roller coincides with the second axis of rotation.

5. The support device of claim 1, wherein the first driving system comprises a linear actuator arranged to be hinged at an end thereof to the base of the machine and at an opposite end to the pivoting arm, whereby an extension and retraction movement of the linear actuator results in a rotational movement of the pivoting arm about the first axis of rotation.

6. The support device of claim 5, wherein the linear actuator comprises first and second pneumatic cylinders, each of which has a body and a rod, wherein the bodies of the first and second pneumatic cylinders are attached to each other with the respective rods facing towards opposite sides, and wherein the rod of the first pneumatic cylinder is arranged to be hinged to the base of the machine while the rod of the second pneumatic cylinder is arranged to be hinged to the pivoting arm.

7. The support device of claim 1, wherein the first driving system comprises a cam mechanism having a cam-shaped control member arranged to be moved along a given direction of movement and a follower which is supported by the pivoting arm and is arranged to cooperate with a control surface of the cam-shaped control member, whereby a movement of the cam-shaped control member along said direction of movement brings about a rotational movement of the pivoting arm about the first axis of rotation.

8. The support device of claim 1, wherein the second driving system comprises a pinion, a rack arranged to control the rotation of the pinion and a motion transmission mechanism for transmitting the rotational movement of the pinion to the support member.

9. A tube working machine comprising a base, a working head, a tube-carrying carriage, and a plurality of support devices, the tube-carrying carriage being arranged to feed the tube to the working head according to a feeding direction, wherein each support device comprises a pivoting arm arranged to be rotatably supported at a first end thereof by the base of the machine for rotation about a first axis of rotation oriented transversely to said feeding direction, a cylindrical roller mounted at a second end of the pivoting arm opposite to said first end with an axis of the cylindrical roller oriented parallel to the first axis of rotation, a variable-profile support member which is rotatably mounted at the second end of the pivoting arm for rotation about a second axis of rotation parallel to the first axis of rotation and has a saddle-shaped cavity for receiving the tube, wherein the cavity has a cross-sectional profile which varies along a cavity length and wherein the cross-sectional profile of the cavity which is presented to the tube has a variable size depending on the angular position of the support member about the second axis of rotation, wherein the cavity has a variable shaped contact surface for contacting the tube, wherein the variable shaped contact surface has a shape which varies along the cavity length, and wherein the support member is movable, by rotation about the second axis of rotation, between a working position, in which the support member receives the tube in the cavity, and a non-working position, in which the support member is placed underneath the cylindrical roller, thereby allowing the tube to be supported on the cylindrical roller, a first driving system for controlling the angular position of the pivoting arm about the first axis of rotation, and a second driving system for controlling the angular position of the support member about the second axis of rotation, wherein the pivoting arm of each support device is rotatably supported at an end thereof by the base for rotation about a first axis of rotation oriented transversely said feeding direction.

10. The machine of claim 9, comprising a first actuation unit for simultaneously actuating the first driving system of some support devices of the machine and a second actuation unit for simultaneously actuating the second driving system of some support devices of the machine.

\* \* \* \* \*